(12) United States Patent
Fedeyko et al.

(10) Patent No.: US 9,579,638 B2
(45) Date of Patent: Feb. 28, 2017

(54) AMMONIA SLIP CATALYST

(71) Applicant: Johnson Matthey Public Limited Company, London (GB)

(72) Inventors: Joseph Michael Fedeyko, Glen Mills, PA (US); Kevin Doura, Plainsboro, NJ (US); Erich Conlan Weigert, Newtown Square, PA (US); Julian Peter Cox, Malvern, PA (US); Hai-Ying Chen, Conshohocken, PA (US); Paul Joseph Andersen, Plymouth Meeting, PA (US)

(73) Assignee: Johnson Matthey Public Limited Company, London (GB)

(*) Notice: Subject to any disclaimer, the term of this patent is extended or adjusted under 35 U.S.C. 154(b) by 6 days.

(21) Appl. No.: 14/446,799

(22) Filed: Jul. 30, 2014

(65) Prior Publication Data

US 2015/0037233 A1 Feb. 5, 2015

Related U.S. Application Data

(60) Provisional application No. 61/859,993, filed on Jul. 30, 2013.

(51) Int. Cl.
  *B01J 29/00* (2006.01)
  *B01J 29/04* (2006.01)
  *B01J 29/06* (2006.01)
  *B01J 21/00* (2006.01)
  *B01J 21/04* (2006.01)
  (Continued)

(52) U.S. Cl.
  CPC ............ *B01J 29/85* (2013.01); *B01D 53/869* (2013.01); *B01D 53/8628* (2013.01); *B01J 23/44* (2013.01); *B01J 23/72* (2013.01); *B01J 23/745* (2013.01); *B01J 35/0006* (2013.01); *B01J 35/04* (2013.01); *B01J 37/0244* (2013.01); *B01J 37/0246* (2013.01); *B01J 37/0248* (2013.01)

(58) Field of Classification Search
  CPC ............ B01J 21/00; B01J 23/40; B01J 23/42; B01J 23/44; B01J 23/72; B01J 23/745; B01J 23/8906; B01J 23/8926; B01J 29/0316; B01J 29/0325; B01J 29/0333; B01J 29/0352; B01J 29/0354; B01J 29/0356; B01J 29/042; B01J 29/043; B01J 29/044; B01J 29/064; B01J 29/068; B01J 29/072
  USPC ..... 502/66, 74, 87, 245, 258, 261–263, 326, 502/327, 331–334, 336, 338, 339, 439, 502/527.12
  See application file for complete search history.

(56) References Cited

U.S. PATENT DOCUMENTS

| | | | |
|---|---|---|---|
| 7,393,511 B2 | 7/2008 | Tran et al. | |
| 7,481,983 B2 * | 1/2009 | Patchett ............ | B01D 53/9418 422/177 |

(Continued)

FOREIGN PATENT DOCUMENTS

| | | |
|---|---|---|
| GB | 2486810 A | 6/2012 |
| WO | 2012075400 A1 | 6/2012 |

(Continued)

*Primary Examiner* — Cam N. Nguyen (57) ABSTRACT

Provided is an ammonia slip catalyst article having supported palladium in a top or upstream layer for oxidation of carbon monoxide and/or hydrocarbons, an SCR catalyst either in the top layer or in a separate lower or downstream layer, and an ammonia oxidation catalyst in a bottom layer. Also provided are methods for treating an exhaust gas using the catalyst article, wherein the treatment involves reducing the concentrations of ammonia and optionally carbon monoxide and/or hydrocarbons in the exhaust gas.

8 Claims, 6 Drawing Sheets

(51) Int. Cl.
*B01J 23/02* (2006.01)
*B01J 23/40* (2006.01)
*B01J 23/42* (2006.01)
*B01J 23/44* (2006.01)
*B01J 23/56* (2006.01)
*B01J 23/70* (2006.01)
*B01J 23/72* (2006.01)
*B01J 23/74* (2006.01)
*B01J 29/85* (2006.01)
*B01J 37/02* (2006.01)
*B01J 35/00* (2006.01)
*B01J 23/745* (2006.01)
*B01J 35/04* (2006.01)
*B01D 53/86* (2006.01)

(56) References Cited

U.S. PATENT DOCUMENTS

| | | | |
|---|---|---|---|
| 7,576,031 B2* | 8/2009 | Beutel | B01J 23/44 502/326 |
| 7,601,662 B2* | 10/2009 | Bull | B01D 53/9418 423/700 |
| 7,722,829 B2* | 5/2010 | Punke | B01D 53/944 422/180 |
| 7,875,573 B2* | 1/2011 | Beutel | B01J 23/44 423/213.2 |
| 7,902,107 B2* | 3/2011 | Patchett | B01J 5/0054 502/527.24 |
| 7,947,238 B2* | 5/2011 | Deeba | B01D 53/944 423/213.2 |
| 8,211,392 B2* | 7/2012 | Grubert | B01D 53/944 423/213.2 |
| 8,252,258 B2* | 8/2012 | Muller-Stach | B01D 53/944 423/213.2 |
| 8,449,852 B1 | 5/2013 | Sung et al. | |
| 8,568,675 B2* | 10/2013 | Deeba | B01D 53/945 422/177 |
| 8,637,426 B2* | 1/2014 | Hoke | B01D 53/945 502/333 |
| 8,663,587 B2* | 3/2014 | Boorse | B01D 53/9431 422/171 |
| 8,734,743 B2* | 5/2014 | Muller-Stach | B01D 53/945 422/170 |
| 8,735,311 B2* | 5/2014 | Bull | B01D 53/9418 423/700 |
| 8,789,356 B2* | 7/2014 | Phillips | B01D 53/9418 60/274 |
| 8,906,329 B2* | 12/2014 | Ballinger | B01D 53/9418 423/213.2 |
| 8,950,174 B2* | 2/2015 | Hilgendorff | B01D 53/945 423/213.2 |
| 8,980,209 B2* | 3/2015 | Hoke | B01D 53/945 423/213.2 |
| 9,034,269 B2* | 5/2015 | Hilgendorff | B01J 37/0244 422/170 |
| 9,162,218 B2* | 10/2015 | Bull | B01D 53/9418 |
| 2002/0131915 A1* | 9/2002 | Shore | B01J 23/56 422/177 |
| 2008/0044329 A1 | 2/2008 | Chen et al. | |
| 2009/0104096 A1* | 4/2009 | Patchett | B01D 53/9418 423/213.5 |
| 2010/0175372 A1 | 7/2010 | Lambert et al. | |
| 2010/0290964 A1 | 11/2010 | Southward et al. | |
| 2011/0271664 A1 | 11/2011 | Boorse et al. | |
| 2011/0286900 A1 | 11/2011 | Caudle et al. | |
| 2012/0107204 A1 | 5/2012 | Cox | |
| 2012/0124975 A1* | 5/2012 | Wei | B01D 53/944 60/297 |
| 2013/0084222 A1 | 4/2013 | Grubert et al. | |
| 2013/0149221 A1 | 6/2013 | Blakeman et al. | |
| 2014/0079616 A1* | 3/2014 | Fedeyko | B01J 37/0244 423/237 |
| 2014/0154163 A1* | 6/2014 | Andersen | B01J 37/0244 423/237 |
| 2014/0212350 A1* | 7/2014 | Andersen | B01J 23/6527 423/237 |
| 2014/0219879 A1* | 8/2014 | Bull | B01D 53/9418 422/170 |
| 2014/0227155 A1* | 8/2014 | Phillips | B01D 53/9418 423/212 |
| 2015/0174564 A1* | 6/2015 | Muller-Stach | B01J 37/0244 423/213.5 |
| 2015/0190798 A1* | 7/2015 | Patchett | B01D 5/0054 502/60 |

FOREIGN PATENT DOCUMENTS

WO 2013079954 A1 6/2013
WO 2014076816 A1 5/2014

* cited by examiner

AMMONIA SLIP CATALYST

CROSS-REFERENCE TO RELATED APPLICATIONS

This application claims priority benefit to U.S. Provisional Patent Application No. 61/859,993 filed on Jul. 30, 2013, which is incorporated herein by reference.

BACKGROUND

Field of Invention

Provided is an oxidation catalyst for treating combustion exhaust gas, and particularly for reducing ammonia slip associated with a selective catalytic reduction process.

Description of Related Art

Combustion of hydrocarbon fuel produces engine exhaust or flue gas that contains, in large part, relatively benign nitrogen ($N_2$), water vapor ($H_2O$), and carbon dioxide ($CO_2$). But the exhaust gases also contains, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of undesirable components, preferably by a process that, in turn, does not generate other noxious or toxic substances.

$NO_x$, which includes nitric oxide (NO), nitrogen dioxide ($NO_2$), and nitrous oxide ($N_2O$), is a burdensome component to remove from exhaust gas generated by lean burn engines. The reduction of $NO_x$ to $N_2$ is particularly problematic in lean burn exhaust gas because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the NO reduction reaction takes place as the gases pass through or over the catalyzed substrate. The chemical equation for stoichiometric SCR reactions using ammonia is:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

Most SCR processes utilize a stoichiometric excess of ammonia in order to maximize the conversion of $NO_x$. Unreacted ammonia that passes through the SCR process (also referred to as "ammonia slip") is undesirable, because the slipped ammonia gas can react with other combustion species and/or negatively impact the atmosphere if released. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania, alumina, silica, zirconia, etc. These catalysts oxidize $NH_3$ to yield $N_2$ and/or secondary $NO_x+H_2O$ as follows:

$$4NH_3+7O_2 \rightarrow 4NO_2+6H_2O$$

$$4NH_3+5O_2 \rightarrow 4NO+6H_2O$$

$$2NH_3+2O_2 \rightarrow N_2O+3H_2O$$

$$4NH_3+3O_2 \rightarrow 2N_2+6H_2O$$

To remedy this secondary NOx formation, typical ASCs comprise a top catalyst layer comprising a conventional SCR catalyst and a bottom catalyst layer comprising the ammonia oxidation catalyst. Exhaust gas containing slipped $NH_3$, and little or no $NO_x$, passes through the top SCR layer of the ASC wherein the SCR catalyst stores a portion of the $NH_3$. Another portion of the NH3 continues to permeate through the catalyst until it reaches the bottom layer where it is oxidized into secondary $NO_x$ and $H_2O$. The secondary $NO_x$ permeates back through the top layer where it reacts with the stored $NH_3$ to produce $N_2$ and $H_2O$.

The top and bottom layers of the ASC are segregated to prevent immediate oxidation of the NH3 which would lead formation of untreated secondary NOx in the exhaust stream. For this reason, the top layer in ASCs is free from noble metals, such as platinum group metals (PGMs). Moreover, the bottom layer containing the PGM-based oxidation catalyst is completely covered by the top layer to prevent untreated secondary NOx from entering the exhaust stream.

SUMMARY OF THE INVENTION

The present invention, in part, pertains to a heterogeneous oxidation catalyst that is particularly effective at concurrently reducing ammonia slip without significant $NO_x$ formation and oxidizing CO and HC. Surprisingly, the inclusion of palladium in the top layer of a bi-layer or tri-layer ASC increases the CO and HC oxidative potential of the catalyst while producing little or no increase in secondary $NO_x$ from the oxidation of $NH_3$. This result is particularly surprising since Pd is known to be a powerful $NH_3$ oxidation catalyst. In the present catalyst, a majority of the $NH_3$ passes through the Pd-layer to a lower layer where it is oxidized.

The ASC of the present invention is useful in several ways. For example, the catalyst can be used in lean burn exhaust gas after-treatment systems which do not include an oxidation catalyst (e.g., a diesel oxidation catalyst (DOC)) upstream of the ASC component. In such systems, the DOC is not necessary because CO and hydrocarbons in the exhaust gas are fully converted into $CO_2$ and $H_2O$ by the ASC. By eliminating the need for additional components, the ASC of the present invention can reduce the footprint of the after-treatment system, as well as its cost.

In another example, the ASC is also used as a diesel exotherm catalyst (DEC) to produce the heat required for regeneration of a downstream diesel particulate filter (DPF). By functioning as a downstream DEC (i.e., downstream of a primary SCR catalyst and optionally a DOC catalyst, but upstream of a DPF), the upstream components are not exposed to the high temperatures required during filter regeneration. That is, the catalyst of the present invention oxidizes fuel injected into the after-treatment system to generate heat, which in turn, combusts the soot which has accumulated on the DPF. The combined ability to reduce ammonia slip and generate an exotherm allows the DEC and DPF combination to be situated downstream and away from the more thermally sensitive SCR and DOC catalysts.

Accordingly, provided is a catalyst article for treating exhaust gas comprising a substrate having a first catalyst layer disposed on and/or within the substrate and a second catalyst layer coated over at least a portion of a second catalyst layer, wherein the first catalyst layer comprises a first oxidation catalyst and the second catalyst layer contains a mixture of (i) a second oxidation catalyst consisting of palladium on a first support and (ii) a catalyst for selectively reducing $NO_x$ and/or storing $NH_3$.

According to another aspect of the invention, provided is a catalyst article for treating an exhaust gas comprising (a) a substrate; (b) a first catalyst layer disposed on and/or within the substrate, wherein the first layer contains an $NH_3$ oxidation catalyst; (c) a second catalyst layer disposed over the first catalyst layer, wherein the second layer contains a catalyst for selectively reducing $NO_x$ and/or storing $NH_3$; and (d) a third catalyst layer disposed over the second catalyst layer, wherein the third catalyst layer comprises supported Pd.

According to another aspect of the invention, provided is a system for treating exhaust gas comprising (a) an exhaust gas manifold; and (b) a substrate having a second catalyst layer disposed on and/or within the substrate and a first catalyst layer coated over at least a portion of a second catalyst layer, wherein the first catalyst layer contains a mixture of (i) a first oxidation catalyst consisting of palladium on a first support and (ii) a catalyst for selectively reducing $NO_x$ and/or storing $NH_3$, and the second catalyst layer comprises a second oxidation catalyst; wherein the substrate is in fluid communication with the exhaust gas manifold and wherein there is no oxidation catalyst between the substrate and the exhaust manifold.

According to another embodiment of the invention, provided is an after-treatment system for engine exhaust gas comprising the following components: (a) a diesel oxidation catalyst for producing an $NO/NO_2$ ratio of about 4:1 to about 1:30 by volume; (b) an injector for introducing a nitrogenous-based reductant into the system; (c) a primary SCR catalyst; (d) an injector for introducing fuel into the system; (e) a second flow-through monolith having a second catalyst layer disposed on and/or within the substrate and a first catalyst layer coated over at least a portion of a second catalyst layer, wherein the first catalyst layer contains a mixture of (i) a first oxidation catalyst consisting of palladium on a first support and (ii) a catalyst for selectively reducing $NO_x$ and/or storing $NH_3$, and the second catalyst layer comprises a second oxidation catalyst; wherein the substrate is in fluid communication with the exhaust gas manifold; and (f) a diesel particulate filter; wherein components (a)-(f) are in consecutive order from upstream to downstream.

According to another aspect of the invention provided is a method for treating exhaust gas comprising the step of contacting an exhaust gas containing $NH_3$ with a catalyst article comprising a substrate having a first catalyst layer disposed on and/or within the substrate and a second catalyst layer coated over the first catalyst layer; wherein the first catalyst layer comprises a first oxidation catalyst and the second catalyst layer contains a mixture of (i) a second oxidation catalyst consisting of supported palladium and (ii) a catalyst for selectively reducing $NO_x$ and/or storing $NH_3$; and wherein the first and second oxidation catalysts are different formulations; wherein said contacting (a) stores at least a portion of the $NH_3$ in the second catalyst layer; (b) oxidizes at least a portion of the $NH_3$ to form $N_2$ and/or secondary $NO_R$; and (c) selectively reducing at least a portion of the secondary $NO_x$ with the stored $NH_3$ to produce $N_2$ and $H_2O$. In certain embodiments, the method further comprises the step of oxidizing at least a portion of CO and/or hydrocarbons in the exhaust gas.

According to yet another aspect of the invention provided is a method for regenerating a particulate filter comprising injecting a hydrocarbon-based fuel into an exhaust gas upstream of an ASC catalyst described herein, and preferably downstream of the primary SCR catalyst, using the combustion reaction to heat the exhaust gas, and using the heated exhaust gas to combust soot and other particulate matter that has accumulated on the filter.

DETAILED DESCRIPTION OF PREFERRED EMBODIMENTS OF THE INVENTION

In a preferred embodiment, the invention is directed to a catalyst article for improving environmental air quality, particularly for improving exhaust gas emissions generated by power plants, gas turbines, lean burn internal combustion engines, and the like. Emissions are improved, at least in part, by reducing the concentrations of HC, CO, $NH_3$ and/or $NO_x$ in the exhaust gas over a broad operational temperature range. The invention can reduce the overall cost and space required for an exhaust gas after-treatment system by performing multiple functions in single unit. In addition, the present invention can improve the thermal durability of an exhaust gas after-treatment system by positioning the high-temperature filter regeneration operation downstream of temperature sensitive DOC and SCR catalysts.

In a preferred embodiment, the present invention comprises a substrate supporting a first oxidation catalyst for oxidizing $NH_3$ primarily into secondary $NO_x$ and $H_2O$, particularly at low temperatures (e.g., below 250° C.); an SCR catalyst for storing $NH_3$ and/or selectively reducing $NO_x$ with $NH_3$ in the presence of $O_2$; and a second oxidation catalyst primarily for oxidizing CO into $CO_2$ and HC into $CO_2$ and $H_2O$, without substantially oxidizing $NH_3$, wherein the second oxidation catalyst is above or upstream of the first oxidation catalyst. As used herein, the term "secondary $NO_x$" refers to $NO_x$ generated by the oxidation of $NH_3$ and does not include $NO_x$ generated as by the combustion of fuel. Preferably, the second oxidation catalyst is selected to fully oxidize CO and HC and is not a partial oxidation catalyst.

The second oxidation catalyst comprises palladium, preferably supported palladium. Optionally, the second oxidation catalyst consists essentially of supported palladium. Preferably, the second oxidation catalyst is essentially free of any catalytically active metal other than Pd. As used herein, the term "catalytically active metal" means a metal that directly participates in the catalytic oxidation of $NH_3$, HC, or CO. As used herein, the term "substantially free" with respect to a metal in the second oxidation catalyst means that the metal either is not present or is present in a concentration low enough so as not to affect the oxidative function of the catalyst. Examples of catalysts essentially free of a specific metal include those in which the specific metal is present in an amount of less than about 1 weight percent, less than about 0.1 weight percent, or less than about 0.01 weight percent, based on the total weight of the Pd in the second oxidation catalyst.

With the exception of Pd, the second oxidation catalyst is preferably free of noble metals, including ruthenium, rhenium, rhodium, silver, osmium, iridium, platinum, and gold. Preferably, the oxidation catalyst is free or essentially free of one or more alkali and alkaline earth metals, such as sodium, potassium, calcium, and magnesium. Preferably, the oxidation catalyst is free or essentially free of vanadium, tungsten, and/or molybdenum. In certain embodiments, the oxidation catalyst is free or essentially free of manganese, silicon, zirconium, aluminum, and oxides thereof, unless the metal is present in the form of a metal oxide support. In certain embodiments, the oxidation catalyst is free or essentially free of transition metals, such as one or metals selected from copper, iron, nickel, cobalt, chromium, hafnium, lanthanum, gallium, cerium, and zinc. In certain embodiments, the oxidation catalyst is free or essentially free of rare earth metals.

Preferably, the palladium in the second oxidation catalyst is supported by a high surface area support such as a metal oxide or a zeolite, with metal oxides being particularly preferred. The palladium component can be incorporated onto the support by any conventional means, such as mixing an aqueous salt solution containing the metal with the support to form a metal colloid washcoat which can then be applied to the substrate. In certain embodiments, the palladium is prefixed on the support via impregnation prior to washcoat batching. Preferably, the palladium is a coating on the high-surface area support.

The type of support for the palladium is not particularly limited provided that it is a particle having a large surface area, is inert, and is suitable for use in an after-treatment system. Examples of support materials include refractory metal oxides such as alumina, silica, zirconia, titania, ceria, and physical mixtures or composites thereof, with alumina and also ceria being particularly preferred. In certain embodiments, the supports have wide pores (e.g., 100-350 Å) or both wide and narrow pores. In certain embodiments, the support has a BET surface area of at least 50 $m^2/g$, preferably about 50-500 $m^2/g$, more preferably about 50-300 $m^2/g$, or about 150-250 $m^2/g$. Refractory metal oxide supports preferably have a pore volume of about 0.1-0.5 g/cc, for example about 0.2-0.4 g/cc, preferably measured by mercury intrusion porosimetry. The mean particle size, based on the particle count, of the support material is preferably about 0.01-10 μm, for example about 0.5-5 μm, about 0.1-1 μm, or about 5-10 μm, and preferably has a majority of the particle count within one of these ranges. In certain embodiments, the $D_{90}$ particle size of the support is within one of these ranges.

Other palladium supports for the second oxidation catalyst include molecular sieves such as aluminosilicates, silicoaluminophosphates, and aluminophosphates having a zeolite-type framework, such as AEI, AFX, CHA, KFI, LEV, ERI, DDR, UEI, RHO, EAB, PAU, MER, GOO, YUG, GIS, UFI, VIN, AEI/CHA intergrowths, BEA, MFI, MOR, and FER.

In certain embodiments, the second oxidation catalyst is a separate and distinct layer disposed on the substrate or disposed over another catalyst layer which is on and/or within the substrate. In such embodiments, the second oxidation catalyst is preferably free of any other catalytic material.

In other embodiments, the second oxidation is disposed on the substrate as a catalyst layer containing a physical mixture of the second oxidation catalyst and an SCR catalyst. For embodiments in which the second oxidation catalyst is disposed on the substrate as a mixture including an SCR catalyst, the mixture is free of any noble metals, particularly PGMs. Preferably, the mixture is a heterogeneous mixture of supported Pd and SCR catalysts, wherein the Pd is uniformly disbursed in the mixture.

The SCR catalyst of the present invention is not particularly limited, provided that it can selectively reduce $NO_x$ in the presence of a reductant in an oxidative environment. The SCR catalyst incorporated into an ASC is used to treat secondary $NO_x$ and is separate and distinct from the SCR catalyst that is used to treat $NO_x$ generated by combustion of fuel. Accordingly, the SCR catalyst incorporated into the ASC can be referred to as a "secondary SCR" catalyst and the SCR catalyst used to treat $NO_x$ generated by combustion of fuel can be referred to as a "primary SCR" catalyst. These different SCR catalysts can have the same formulation or different formulations.

In certain embodiments, the SCR catalyst comprises at least one promoter metal on a high surface area support including refractory metal oxides and molecular sieves such as aluminosilicate (zeolites), silico-aluminophosphate (SAPOs), or aluminophosphate (AlPOs). In certain embodiments, the SCR catalyst has little to no $NH_3$ oxidative capacity, but can store and release $NH_3$ as a function of temperature, as a function of a lean or rich environment, or both. As used herein, the term "lean environment" refers to an exhaust gas generated by combusting fuel in excess of the stoichiometric air-fuel mixture (e.g., excess air) or an exhaust gas containing an amount of oxygen at least equivalent to a lean burn exhaust gas. As used herein, the term "rich environment" means an exhaust gas generated by combustion of a rich mixture of air-fuel.

Preferred promoter metals are selected from the group consisting of V, Cr, Co, Cu, Fe, Hf, La, Ce, In, V, Mn, Ni, Zn, Ga, either individually or combinations thereof. The promoter metal can be a free metal or metal ion and can be incorporated on or within the support by various techniques including ion exchange, incipient wetness, direct coating, or in situ during the synthesis of the support material. Preferred promoter metals include Cu and Fe, particularly when the promoter metal is loaded on and/or within a molecular sieve, preferably a small pore zeolite.

In certain embodiments, the promoter metal oxide is vanadium such as free vanadium, vanadium ion, or an oxide of vanadium or a derivative thereof. Preferably, the form of vanadium is vanadia ($V_2O_5$). In addition to vanadium, the promoter metal oxide can include other catalytically active metal oxides such as oxides of tungsten and/or oxides of molybdenum. As used herein, a "catalytically active" metal oxide is one that directly participates as a molecular component in the catalytic reduction of $NO_x$ and/or oxidization of $NH_3$ or other nitrogenous-based SCR reductants. In certain embodiments, the SCR catalyst is $V_2O_5/WO_3/TiO_2$, and optionally includes $MoO_3$.

Preferred molecular sieve supports include zeolites and SAPOs having a framework selected from the group consisting of AEI, AFX, CHA, KFI, LEV, ERI, DDR, UEI, RHO, EAB, PAU, MER, GOO, YUG, GIS, UFI, VIN, AEI/CHA intergrowths, BEA, MFI, MOR, and FER. In certain embodiments, the framework is selected from AEI, CHA, and intergrowths thereof. Preferred aluminosilicate molecular sieves have a silica-to-alumina ratio of about 10 to about 50, preferably about 15 to about 25.

Particularly preferred SCR catalyst include $V_2O_5/WO_3/TiO_2$, optionally including $MoO_3$; Cu loaded on an aluminosilicate molecular sieve having a framework selected from AEI, CHA, or a combination or intergrowth thereof; and Fe loaded on an aluminosilicate molecular sieve having a framework selected from BEA and FER.

The first oxidation catalyst is preferably selected to fully oxidize $NH_3$ into $NO_x$ and $H_2O$, including at low temperatures such as below about 250° C., below about 200° C., or below about 150° C. Preferably the first oxidation catalyst is not a partial oxidation catalyst. The first oxidation catalyst preferably contains a noble metal, such as ruthenium, rhenium, rhodium, palladium, silver, osmium, iridium, platinum, gold, or a combination thereof. Preferred metals for the first oxidation catalyst include PGMs, particularly Pt and combinations of Pt and Pd. In certain embodiments, the first oxidation catalyst contains at least about 30 weigh percent, at least about 50 weight percent, at least about 60 weight percent, at least about 75 weight percent, or at least about 90 weight percent Pt, based on the total weight of the noble metal present in the first oxidation catalyst.

The metal of the first oxidation catalyst is preferably supported by a high surface area support. The type of support for first oxidation catalyst metal is not particularly limited provided that it is a particle having a large surface area, is inert, and is suitable for use in an after-treatment system. Examples of support materials include refractory metal oxides such as alumina, silica, zirconia, titania, ceria, and physical mixtures or composites thereof, with alumina being particularly preferred. In certain embodiments, the supports have wide pores (e.g., 100-350 Å) or both wide and narrow pores. In certain embodiments, the support has a BET surface area of at least 50 $m^2/g$, preferably about 50-500 $m^2/g$, more preferably about 50-300 $m^2/g$, or about 150-250 $m^2/g$. Refractory metal oxide support preferably have a pore volume of about 0.1-0.5 g/cc, for example about 0.2-0.4 g/cc, preferably measured by mercury intrusion porosimetry. The mean particle size, based on the particle count, of the support material is preferably about 0.01-10 µm, for example about 0.5-5 µm, about 0.1-1 µm, or about 5-10 µm, and preferably has a majority of the particle count within one of these ranges. In certain embodiments, the $D_{90}$ particle size of the support is within one of these ranges.

Other supports for the metal in the first oxidation catalyst include molecular sieves such as aluminosilicates, silicoaluminophosphates, and aluminophosphates having a zeolite-type framework, such as AEI, AFX, CHA, KFI, LEV, ERI, DDR, UEI, RHO, EAB, PAU, MER, GOO, YUG, GIS, UFI, VIN, AEI/CHA intergrowths, BEA, MFI, MOR, and FER.

The catalysts of the present invention can be utilized in a heterogeneous catalytic reaction systems (i.e., solid catalyst in contact with a gas reactant). To improve contact surface area, mechanical stability, and fluid flow characteristics, the catalyst components can be disposed on and/or within a substrate, for example as a coating. In certain embodiments, a washcoat containing one or more of the catalyst components is applied as a coating to an inert substrate, such as corrugated metal plate or a honeycomb cordierite brick. The washcoat is preferably a solution, suspension, or slurry. Suitable coatings include surface coatings that cover a portion or the entire substrate, coating that penetrate a portion of the substrate, coatings that permeate the substrate, or some combination thereof. In addition to the catalyst component, a washcoat can also include components, such as fillers, binders, stabilizers, rheology modifiers, and other additives, including one or more of alumina, silica, non-zeolite silica alumina, titania, zirconia, ceria. In certain embodiments, the washcoat comprises pore-forming agents such as graphite, cellulose, starch, polyacrylate, and polyethylene, and the like. These additional components do not necessarily catalyze the desired reaction, but instead improve the catalytic material's effectiveness, for example by increasing its operating temperature range, increasing contact surface area of the catalyst, increasing adherence of the catalyst to a substrate, modifying rheology for better processing, etc. Typically, metal oxide particles used as binders are distinguishable over metal oxide particles used as supports based on particle size, with the binder particles being significantly larger relative to support particles.

In certain embodiments, the support for the first oxidation catalyst is kneaded along with other components such as fillers, binders, and reinforcing agents, into an extrudable paste which is then extruded through a die to form a honeycomb brick. Before or after the honeycomb brick is dried and/or calcined, the noble metal component of the first oxidation catalyst is added to either one or more portions of the brick or to the entire brick in order to form the first oxidation catalyst. In other embodiments, the first oxidation catalyst containing the supported noble metal is incorporated into the extrudable paste prior to extrusion. The SCR catalyst and second oxidation catalysts are then applied as coatings on the extruded first oxidation catalyst brick.

Two substrate designs useful in the present invention are plate and honeycomb. Plate-type catalysts have relative lower pressure drops and are less susceptible to plugging and fouling than the honeycomb types, but plate configurations are much larger and more expensive. The plates are typically constructed of metal or corrugated metal.

Honeycomb substrates comprise multiple adjacent, parallel channels that generally extend from the inlet face to the outlet face of the substrate and are either open on both ends (flow-through substrates) or are capped on alternating ends in a checker-board type pattern (wall-flow filters). This geometry result in a high-surface area-to-volume ratio. Honeycomb configurations are more compact than plate types, but have higher pressure drops and plug more easily. However, for most mobile applications, preferred substrates are honeycombs.

For certain applications, the honeycomb flow though monolith has a high cell density, for example about 600 to 800 cells per square inch, and/or an average internal wall thickness of about 0.18-0.35 mm, preferably about 0.20-0.25 mm. For certain other applications, the honeycomb flow through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite e.g. acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate. In certain embodiments, the substrate is inert.

The substrate wall of a honeycomb preferably has a porosity and pore size that is conducive for washcoating. Porosity is a measure of the percentage of void space in a porous substrate. Preferably, the porous substrate has a porosity of about 30 to about 80%, for example about 40 to about 75%, about 40 to about 65%, or from about 50 to about 60%. The pore interconnectivity, measured as a percentage of the substrate's total void volume, is the degree to which pores, void, and/or channels, are joined to form continuous paths through a porous substrate, i.e., from the inlet face to the outlet face of a filter. Preferably, the porous substrate has a pore interconnectivity volume of at least about 30%, more preferably at least about 40%.

Mean pore size of the substrate wall can be determined by any acceptable means, including by mercury porosimetry. Preferred porous substrates have a mean pore size of about 10 to about 40 µm, for example about 20 to about 30 µm, about 10 to about 25 µm, about 10 to about 20 µm, about 20 to about 25 µm, about 10 to about 15 µm, and about 15 to about 20 µm.

Figure 1A:
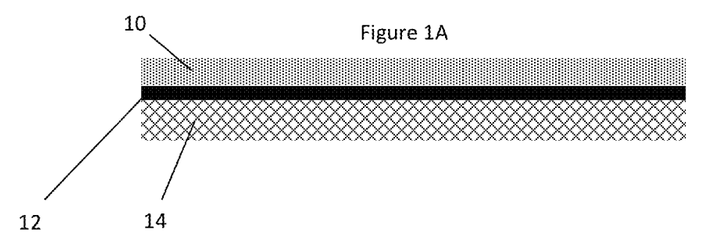
FIGS. 1A-1E are drawings of catalyst articles according to certain embodiments of the present invention.

Turning to FIG. 1A, shown is an embodiment of the invention having a support wall (14), a first layer having a first oxidation catalyst 12, and a second layer having a mixture of a second oxidation catalyst and an SCR catalyst. Generally, a catalyst layer of the present invention permeates the substrate; penetrates a portion of the substrate, for example a majority portion; coats the surface of the substrate; or some combination thereof. Here, the first layer 12 is disposed directly on the substrate 14 as an underlayer and the second layer 10 is disposed over the first layer 12 as an overlayer. Preferably, the first layer 12 and the second layer 10 are physically distinct and separate, but consecutive layers. As used herein, the term "consecutive" with respect to the layers means that each layer is contact with its adjacent layer(s) and that the layers as a whole are arranged one on top of another on the substrate. As used herein the terms "first layer" and "second layer" are used to describe the relative positions of catalyst layers in the catalyst article with respect to the normal direction of exhaust gas flow through, past, and/or over the catalyst article. Under normal exhaust gas flow conditions, exhaust gas contacts and at least partially penetrates the second layer before contacting the first layer, and subsequently returns through the second layer to exit the catalyst component.

In FIG. 1A, the first and second layers are disposed over the entire axial length of the substrate. However, in other embodiments one or more of the catalysts layers cover only a portion of the substrate (See FIG. 1D). For example a catalyst layer can be applied to about 10 percent of the length of the substrate, from the front of the substrate 46 or the rear of the substrate 48, relative to the overall direction of exhaust gas flow 50 through the substrate. In certain embodiments, at least the first oxidation catalyst layer is coated on a portion at the rear of the substrate 48. In other embodiments, the catalyst layers cover about 25 percent, about 50 percent, or about 75 percent of the substrate, preferably from the rear 48 or front 46 of the substrate. The catalyst coatings may be applied to the same or different portions of the substrate, but preferably the coating containing the SCR catalyst completely covers the coating containing the first oxidation catalyst so that all exhaust gas being treated by the catalyst layers will first pass through the second layer before being able to reach the first layer. Preferably, the coating containing the second oxidation catalyst is preferably on top of and/or is upstream of the coating or layer containing the first oxidation catalyst. Preferably, the second layer completely covers the first layer so that all exhaust gas being treated by the catalyst layers will first pass through the second layer before being able to reach the first layer.

Figure 1B:
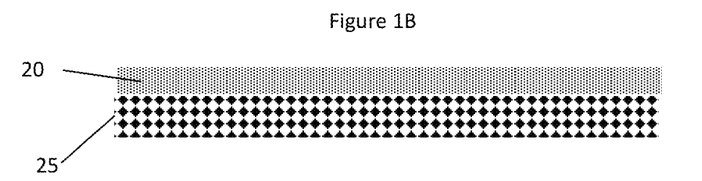

In FIG. 1B, shown is a preferred embodiment of the invention wherein the first oxidation catalyst is disposed within a highly porous substrate wall 25. The coated substrate is covered with a layer containing a mixture of both the SCR catalyst and the second oxidation catalyst. An example of this embodiment includes Pt permeated into or coated within the wall of a high porosity substrate, preferably a flow-through substrate. The Pt-containing substrate is then coated with a mixture of the SCR catalyst and second oxidation catalyst. Alternatively, the Pt-containing substrate can contain separate SCR catalyst layer and second oxidation catalyst layer. In another embodiment, the Pt-containing substrate is an extruded catalyst which is then coated with the SCR/second oxidation mixed layer or separate SCR and second oxidation catalyst layers.

Figure 1C:
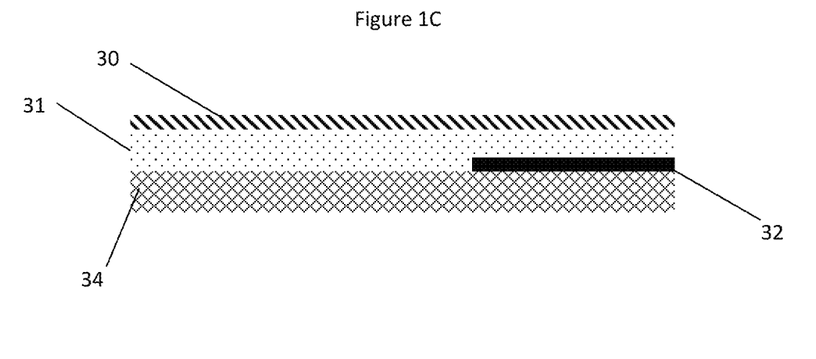

FIG. 1C shows an embodiment of the invention wherein the second oxidation catalyst 30 forms a separate and distinct but consecutive layer over the SCR catalyst layer 31. Here, the second oxidation catalyst and SCR catalyst are not mixed and applied as a single washcoat, but instead are formed on the substrate as separate layers. Importantly, the SCR catalyst layer is disposed over the entire first oxidation catalyst layer 32, and the second oxidation catalyst layer is disposed over the SCR layer. The SCR layer covers the entire first oxidation catalyst layer to prevent untreated secondary NOx formed via ammonia oxidation in the lower layer from exiting the system without contacting the SCR catalyst. In certain embodiments, such as the one seen in FIG. 1C, first oxidation catalyst is disposed on only a portion of the substrate, preferably the rear portion, while the SCR catalyst layer covers the entire substrate. In other embodiments, the first oxidation catalyst is applied to the entire length of the substrate.

Figure 1D:
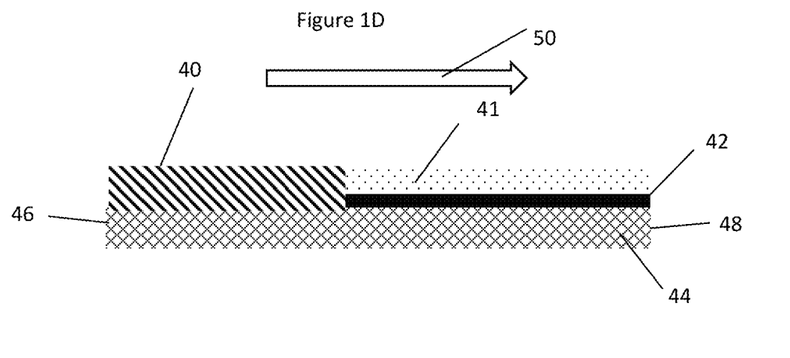

Importantly, the second oxidation catalyst is disposed over and/or upstream of the SCR catalyst layer. In FIG. 1D, the second oxidation catalyst 40 is coated directly on the substrate upstream of the SCR and first oxidation catalysts, wherein "upstream" vis-à-vis "downstream" is relative to the normal direction of exhaust gas flow 50 through or over the substrate. In certain embodiments, the second oxidation catalyst is incorporated into a portion or zone of the substrate wall which is upstream of a downstream portion or zone of the substrate which contains the SCR and first oxidation catalyst.

Figure 1E:
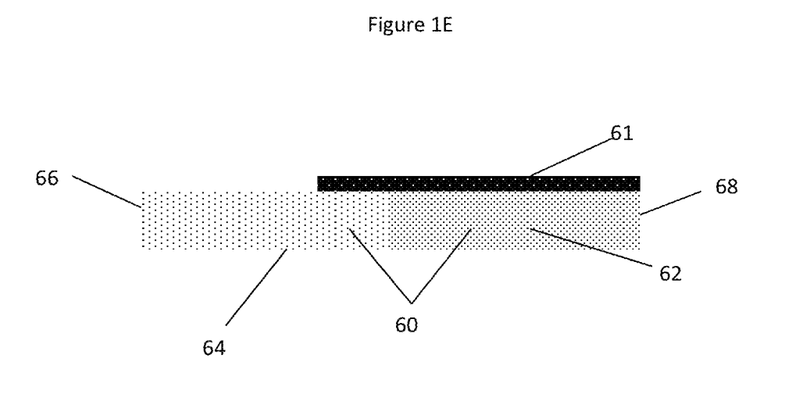

Alternatively to being coated on the substrate wall, the second oxidation catalyst can be incorporated into a high porosity substrate wall, for example as an interior coating that permeates the wall or can be incorporated into extrudable paste which forms the substrate. The second oxidation catalyst can be limited to an upstream zone or can be incorporated into the entire length of the substrate, provided that the SCR and first oxidation catalyst are disposed in a downstream portion or zone. In certain embodiments, the second oxidation catalyst can be incorporated into the entire length of the substrate, the first oxidation catalyst can be coated or impregnated within the walls over the second oxidation catalyst, provided that the first oxidation catalyst is restricted to a zone at the rear of the substrate, and the SCR catalyst can be coated over the zone containing the first oxidation catalyst. FIG. 1E shows a high porosity substrate wall 64 with a second oxidation catalyst 60 in the wall along the entire length of the substrate from the front end 66 to the rear end 68, a first oxidation catalyst 62 on a rear zone within the wall, wherein the rear zone also contains the first oxidation catalyst 60, and a SCR coating 61 that covers at least the rear zone. In such embodiments, the rear zone contains a noble metal, such as Pt, in addition to the Pd.

In certain embodiments, the washcoat or impregnation loading on and/or within the substrate for each layer or for the combination of two or more layers is 0.1 to 8 g/in$_3$, more preferably 0.5 to 6 g/in$_3$, and even more preferably 1 to 4 g/in$_3$. In certain embodiments, the washcoat or impregnation loading on and/or within the substrate for each layer or for the combination of two or more layers is >1.00 g/in$^3$, such as >1.2 g/in$^3$, >1.5 g/in$^3$, >1.7 g/in$^3$ or >2.00 g/in$^3$ or for example 1.5 to 2.5 g/in$^3$.

In certain embodiments, the second oxidation catalyst is present in an amount sufficient to produce a Pd loading of about 0.1 to about 50, more preferably about 0.5 to about 20, and even more preferably about 1 to about 10 g Pd/ft$^3$.

In certain embodiments, the first oxidation catalyst is present in an amount sufficient to produce a catalyst loading of about 0.1 to about 75, more preferably about 0.5 to about 20 or about 30-50 g noble metal/ft$^3$, and even more preferably about 1 to about 10 g noble metal/ft$^3$, although some applications in which the catalyst is used to generate an exotherm may contain a first oxidation catalyst having a noble metal loading up to 75 g/ft$^3$, for example up to about 50 g/ft$^3$. The noble metal ranges described above are particularly relevant when the noble metal is Pt.

In certain embodiments, the SCR catalyst contains about 0.1 to about 10 weight percent, more preferably about 1 to about 7 weight percent, and even more preferably about 2.5 to about 5 weight percent of a promoter metal based on the total weight of the promoter metal and support. In at least one embodiment of the present invention, the weight ratio of the SCR catalyst layer to the first oxidation catalyst layer is from about 0.5:1 to about 10:1, and more preferably from about 2:1 to about 7:1.

Figure 2A:
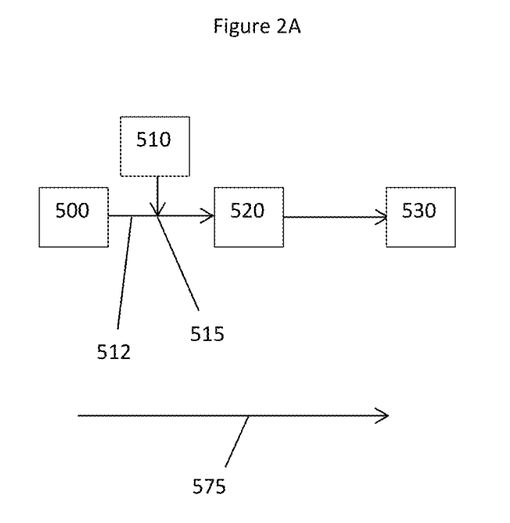
FIGS. 2A-2B are diagrams of exhaust gas after-treatment systems according to embodiments of the invention.

In certain embodiments, the invention is an after-treatment exhaust system adapted to treat NO$_x$, CO, NH$_3$, and/or HC generated from a lean burn combustion process, such as exhaust gas from a diesel engine or stationary gas turbine. In FIG. 2A, shown is an embodiment of the system comprising an exhaust manifold 500, an SCR catalyst 520 downstream of the exhaust manifold 500, an optional source of nitrogenous reductant 510 introduced into the exhaust gas stream (not shown) at a point 515 between the manifold 500 and the SCR catalyst 520, and an ASC catalyst as described herein 540 downstream of the SCR catalyst 520. Here, the SCR catalyst 520 and ASC catalyst 530 are shown as separate bricks. These separate bricks can be adjacent to, and in contact with, each other or separated by a specific distance, provided that they are in fluid communication with each other and provided that the SCR catalyst brick is disposed upstream of the ammonia slip catalyst brick. In other embodiments, the SCR catalyst 520 and ASC catalyst 530 components are combined on the same brick in an upstream/downstream arrangement. For example, the SCR catalyst can be on the upstream side of a flow through substrate and the ASC catalyst can be on the downstream side of the flow-through substrate. In other embodiments, the SCR catalyst is coated on the inlet side of a wall-flow filter and the ASC catalyst is coated on the outlet side of the flow through filter. Other components, such as a downstream or upstream DPF, may be included as well. Here, the terms "upstream" and "downstream" refer to the relative position of components in the after-treatment system based on the normal direction of exhaust gas flow 575 through the system.

The exhaust gas manifold is preferably a conduit for directing exhaust gas leaving the engine into the after-treatment system. Other components, such as a turbocharger, may optionally be included at or near the exhaust gas manifold 500. After passing through the manifold, the exhaust gas contacts a primary SCR catalyst to selectively reduce NO$_x$ from the exhaust gas. The type SCR catalyst is not particularly limited, but is preferably an SCR catalyst as described herein. The standalone, upstream SCR catalyst 520 can have the same formulation or a different formulation relative to the SCR catalyst utilized in the ASC component 540.

In certain embodiments, such as the one shown in FIG. 2A, the system comprises a source of nitrogenous reductant 510 such as urea, ammonia, or a precursor or derivative thereof, which is injected or otherwise introduced into the exhaust gas stream (not shown) upstream of the SCR catalyst. In other embodiments, the system is free of a component that injects a nitrogenous based reductant into the system and, instead, at least a portion of the nitrogen-based reductant, particularly NH$_3$, for consumption in the SCR process is supplied by a NO$_x$ adsorber catalyst (NAC), a lean NO$_x$ trap (LNT), or a NO$_x$ storage/reduction catalyst (NSRC), disposed upstream of the SCR catalyst. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, NH$_3$ may be generated over a NO$_x$ adsorber catalyst. The SCR catalyst downstream of the NO$_x$ adsorber catalyst may improve the overall system NO$_x$ reduction efficiency. In the combined system, the SCR catalyst is capable of storing the released NH$_3$ from the NAC catalyst during rich regeneration events and utilizes the stored NH$_3$ to selectively reduce some or all of the NO$_x$ that slips through the NAC catalyst during the normal lean operation conditions.

The ASC component 530 is downstream of the SCR catalyst and functions to both reduce ammonia slip through the system and oxidize at least a portion, and preferably at least a majority, of CO and/or HC that might be in the exhaust gas. Preferably, the system is free of an oxidation catalyst, such as a diesel oxidation catalyst on a separate substrate, upstream of the ASC component 540.

Figure 2B:
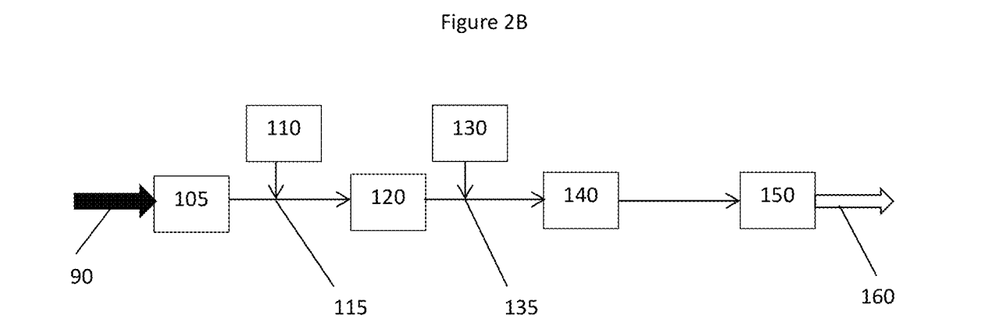

FIG. 2B shows another embodiment of the invention that is directed to an exhaust gas after-treatment system for accepting exhaust gas 90 containing NO$_x$, CO, and HC, such as an exhaust gas generated by a lean burn engine and treating the exhaust gas to produce a cleaned exhaust gas 160 containing lower concentrations of NO$_x$, CO, and/or HC, relative to exhaust gas 90. The after-treatment system in FIG. 2B comprises a fuel source 130 introduced at a point 135 downstream of SCR catalyst 120 and DOC catalyst 105.

Preferably, the fuel source 130 is introduced into the after-treatment system at a point 135 between the SCR catalyst 120 and the ASC catalyst 130, wherein the system is preferably free of any catalyst component between the SCR catalyst 120 and the ASC catalyst 140.

The fuel source is typically a hydrocarbon-based fuel that is the same or similar to the fuel being used by the engine generating the exhaust gas. The fuel is periodically introduced into the exhaust system upstream of a DPF component 150 and serves as a reactant in an exothermic reaction. More particularly, the fuel is oxidized by the ASC 140 to generate heat via an exothermic reaction. The heat, in turn, is used to combust soot or other particulate matter that has accumulated on a DPF, thereby removing the soot and regenerating the DPF. Regenerating the DPF prevents clogging and excessive system backpressure. The DPF of the present invention is preferably a ceramic wall-flow filter. The filter can be uncoated or coated with one or more catalysts. Regeneration of the filter can be performed actively or passively.

The system further includes an optional sub-system for introducing a nitrogenous based reductant 110 (e.g., urea, ammonia, or precursors or derivatives thereof) into the system at a point 115 upstream of the SCR catalyst 120 and downstream of a DOC component 105.

The system comprises an oxidation catalyst 105 (e.g., a diesel oxidation catalyst (DOC)) for oxidizing nitrogen monoxide in the exhaust gas to nitrogen dioxide can be located upstream of a point 115 of metering the nitrogenous reductant into the exhaust gas. The DOC can also oxidize in full or in part CO and/or HC in the exhaust gas. In one embodiment, the oxidation catalyst is adapted to yield a gas stream having a ratio of NO to $NO_2$ of from about 4:1 to about 1:3 by volume, e.g. at an exhaust gas temperature at oxidation catalyst inlet of 250° C. to 450° C. prior to entering the SCR catalyst. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In yet another embodiment of the invention, provided is a method for treating an exhaust gas, preferably by reducing the concentration of at least one of $NO_x$, $NH_3$, CO, HC, and particulate matter in an exhaust gas generated by a lean-burn combustion process. Preferably, the process comprises a step for oxidizing excess $NH_3$ (ammonia oxidation or AMOX) not converted by an upstream SCR reaction.

In a preferred embodiment, the invention is a method for treating an exhaust gas comprising the steps of reduction of $NO_x$ compounds and/or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas.

In certain embodiments, the SCR and/or AMOX process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, the invention is a method for regenerating a filter. In this embodiment, the catalyst article is used to combust a hydrocarbon-based fuel injected into the exhaust gas upstream of the ASC, and preferably downstream of the primary SCR catalyst. The combustion heats the exhaust gas which, in turn, contacts the particulate filter. The high temperature exhaust gas promotes the combustion of soot and other particulate matter on the filter, thus removing the soot and particulate matter. Removing the soot and particulate matter regenerates the filter.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain embodiments, the invention is directed to an after-treatment system for a rich-burn combustion comprising a three-way (TWC) catalysts to reduce the emissions of nitrogen oxides ($NO_x$), hydrocarbons (HC), and carbon monoxide (CO) and a downstream ASC catalyst described herein. Operating a combustion process, such as an engine, under rich conditions in which the air-to-fuel ratio has an amount of fuel that is greater than stoichiometric (i.e. the air-to-fuel ratio is below the stoichiometric ratio), a significant portion of the engine out $NO_x$ is converted to ammonia ($NH_3$) over the three-way catalysts and, but for the ASC catalyst, is emitted as a secondary emission. For a typical rich-burn engine that is equipped with a TWC catalyst, the tailpipe $NH_3$ can be around 400 ppm.

According to an embodiment of the present invention, a system for reducing ammonia (NH3) emissions comprises: (a) a first component comprising a first substrate and a three-way catalyst disposed thereon, wherein the first component is disposed upstream of, and in fluid communication with, a second component comprising a second substrate and an ASC catalyst having a first catalyst layer disposed on and/or within the second substrate and a second catalyst layer coated over the first catalyst layer; wherein the first catalyst layer comprises a first oxidation catalyst and the second catalyst layer contains a mixture of (i) a second oxidation catalyst consisting of supported palladium and (ii) a catalyst for selectively reducing $NO_x$ and/or storing $NH_3$; and wherein the first and second oxidation catalysts are different formulations; and optionally (b) an oxygen-containing gas input disposed between said first and second components. In a further embodiment of the present invention, the system additionally includes: (c) a first gaseous feed stream comprising exhaust gas derived from a rich-burn combustion process, wherein said feed stream is upstream of, and in fluid communication with, the first component; and (d) a conduit disposed between, and in fluid communication with, the first and second components and in fluid communication with said oxygen-containing gas input. In at least one embodiment, the small pore molecular sieve for $NH_3$ oxidation is a Cu-supported CHA Framework Type small pore molecular sieve, such as a Cu-supported SAPO-34.

In another embodiment of the present invention, a method for reducing ammonia ($NH_3$) emission comprises: introducing an oxygen-containing gas into an exhaust gas having $NH_3$ and a lambda <1 to provide an oxygenated gas stream; and exposing the oxygenated gas stream to an $NH_3$ oxidation catalyst comprising at least one small pore molecular sieve supporting at least one transition metal to selectively oxidize at least a portion of the $NH_3$ to $N_2$. In yet another embodiment of the present invention, the method further comprises, upstream of the step of introducing an oxygen-containing gas, the step of: exposing a rich burn exhaust gas to a three-way catalyst for converting nitrogen oxides (NOx), hydrocarbons (HC), and carbon monoxide (CO) to produce the gas stream having $NH_3$ and a lambda <1. The oxygen-containing gas may be introduced to produce an oxygenated gas stream having an $O_2$:$NH_3$ ratio of at least about 1:1, preferably from about 2:1 to about 1:1. In at least one embodiment, the oxygen-containing gas comprises at least 0.1% oxygen, such as ambient air. The exposing step preferably occurs when rich burn exhaust gas is at a temperature of at least about 350° C., preferably in the range from about 400-650° C.

The TWC preferably comprises or consists of a single layer, or multiple layers, of active catalyst materials (i.e., platinum group metal (PGM) or non-PGM), supported on a carrier material, which may or may not have additional additives to enhance specific catalyst activity (e.g., $H_2S$ suppression, $NO_x$ storage, HC storage) in the form of either a coated monolith or in extruded form.

EXAMPLES

Example 1

Preparation of ASC Catalysts Having Pd in Top Layer

A flow-through honeycomb core (4.66 inches by 3.0 inches, 400 cpsi, 4 mil wall thickness) was coated with a first oxidation catalyst to form a bottom layer and then coated with a second oxidation catalyst/SCR catalyst to form a top layer over the bottom layer.

The catalyst of the bottom layers were prepared as follows: Add milled gamma alumina washcoat to an appropriate container. The d50 of the gamma alumina was determined to be about 3.2-4.0 μm. Deionized water was mixed into the washcoat using a high shear mixer and succinic acid was added to the washcoat to form a gel. Various amounts of platinum nitrate and optionally palladium nitrate were added to the gel and then the material was mixed to form a slurry. The slurry was applied to the honeycomb core as a bottom catalyst layer and the coated core was dried and calcined. The various amounts of Pt and Pd in the samples are show in Table 1.

The catalysts of the top layers were prepared as follows: A copper acetate solution was mixed with SAPO-34 to produce a catalyst having about 2.5 weight percent Cu. Separately, Pd nitrate and succinic acid were mixed in a 1.1 succinic/Pd weight ratio in deionized water to prepare an incipient wetness solution. This solution was added to a gamma alumina support by incipient wetness targeting a solution amount 5% above the incipient wetness point to yield a wet paste. The paste was dried, ground, and fired at 500° C. for 2 hours in a static oven using a ramp rate of 3° C./min.

Separately, a dispersion of alumina in deionized water was formed. The dried Cu/SAPO-34 was added to the dispersion, followed by addition of the dried Pd/alumina. The resulting washcoat was applied to the honeycomb core as a top catalyst layer and the coated core was dried and calcined. The top washcoat had a loading of about 2.6-2.8 $g/in^3$ which included about 0.35 $g/in^3$ alumina and about 2 $g/in^3$ of Cu/SAPO-34. The bottom washcoat had a loading of about 0.7 $g/in^3$.

TABLE 1

| Sample No. | Washcoat Layer | Cu ($g/ft^3$) | Pd ($g/ft^3$) | Pt ($g/ft^3$) |
|---|---|---|---|---|
| 1 | Top | 90 | 5 | |
|   | Bottom | | | 40 |
| 2 | Top | 90 | 5 | |
|   | Bottom | | | 35 |
| 3 | Top | 90 | 1 | |
|   | Bottom | | | 35 |
| 4 | Top | 90 | 10 | |
|   | Bottom | | | 35 |
| 5 | Top | 90 | 5 | |
|   | Bottom | | 30 | 5 |
| 6 | Top | 90 | 5 | |
|   | Bottom | | 33 | 2 |

Example 2

Catalyst Performance

Figure 3:
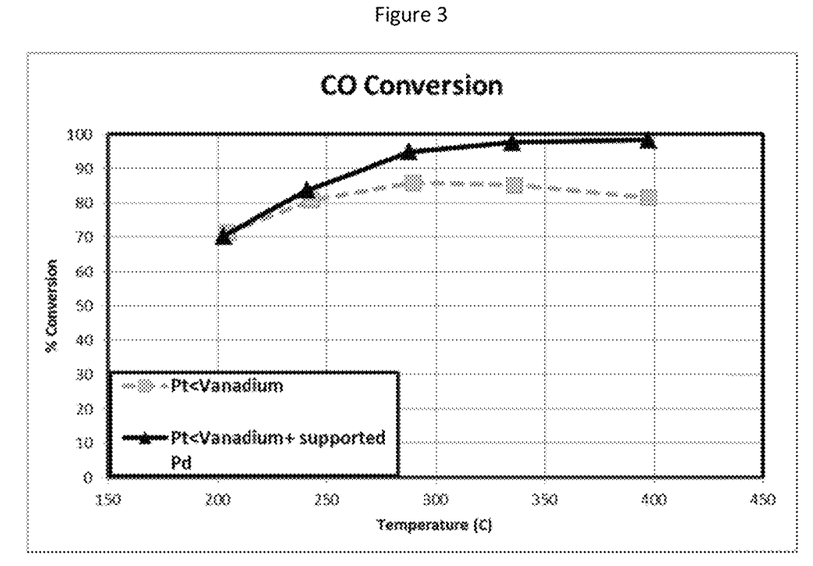
FIG. 3 is a graph depicting comparative CO conversion for an embodiment of the invention.
Figure 4:
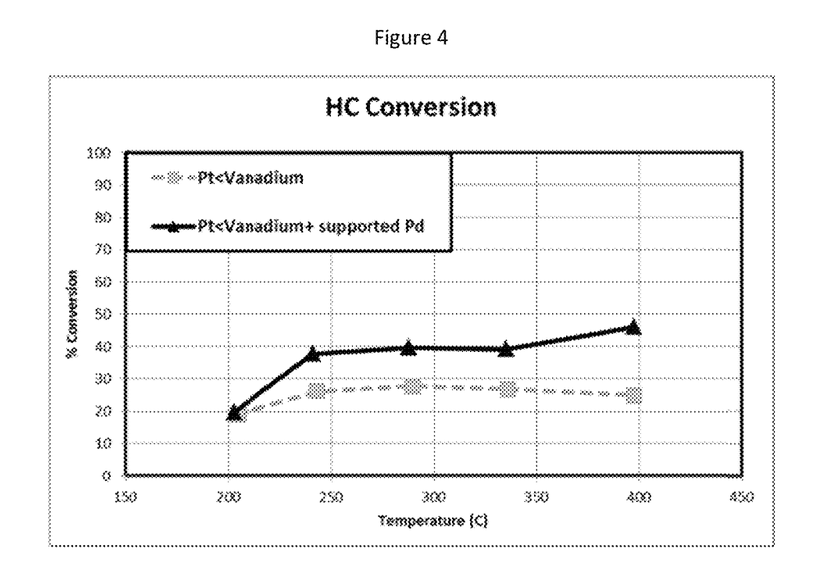
FIG. 4 is a graph depicting comparative HC conversion for an embodiment of the invention.
Figure 5:
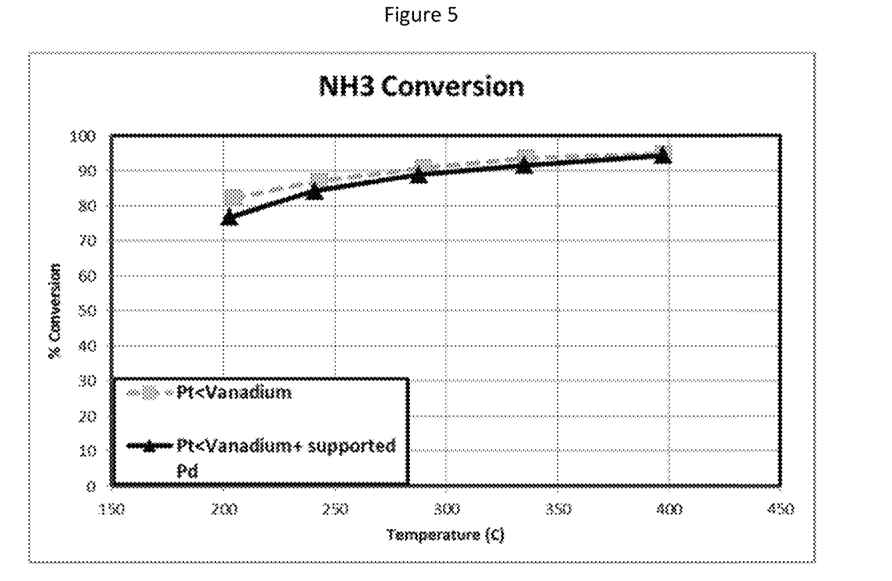
FIG. 5 is a graph depicting comparative $NH_3$ conversion for an embodiment of the invention.
Figure 6:
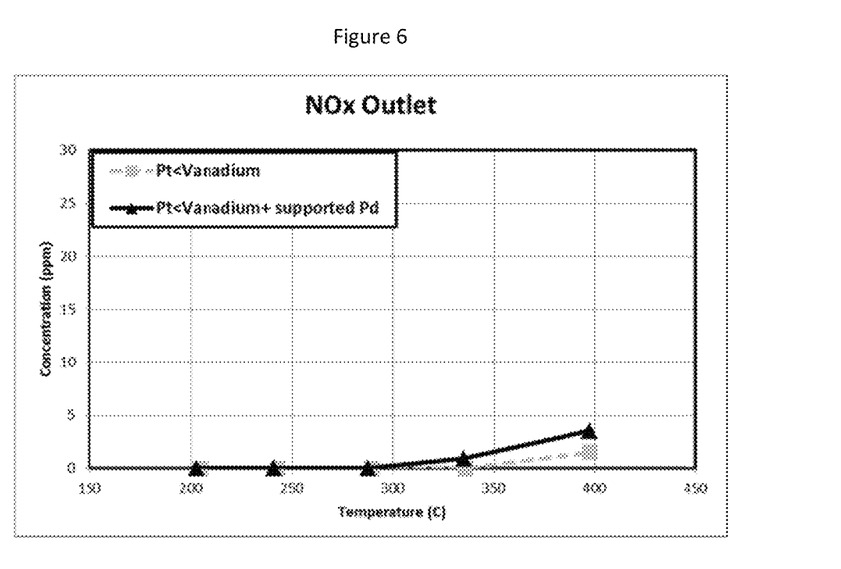
FIG. 6 is a graph depicting comparative $NO_x$ output for an embodiment of the invention.

A catalyst sample having a top layer containing a mixture of a vanadium-based SCR catalyst and a Pd oxidation catalyst and a bottom layer containing Pt AMOX catalyst was evaluated for $NH_3$ conversion, CO conversion, and HC conversion. These results were compared to a similar catalyst, but without the Pd oxidation catalyst in the top layer. The catalyst having Pd in the top layer shows significantly better CO and HC conversion performance compared to the catalyst without Pd in the top layer (FIGS. 3 and 4). Surprisingly, the catalyst prepared with and without the Pd top layer show very similar performance in terms of $NH_3$ conversion and $NO_x$ outlet. (FIG. 5)

Figure 7:
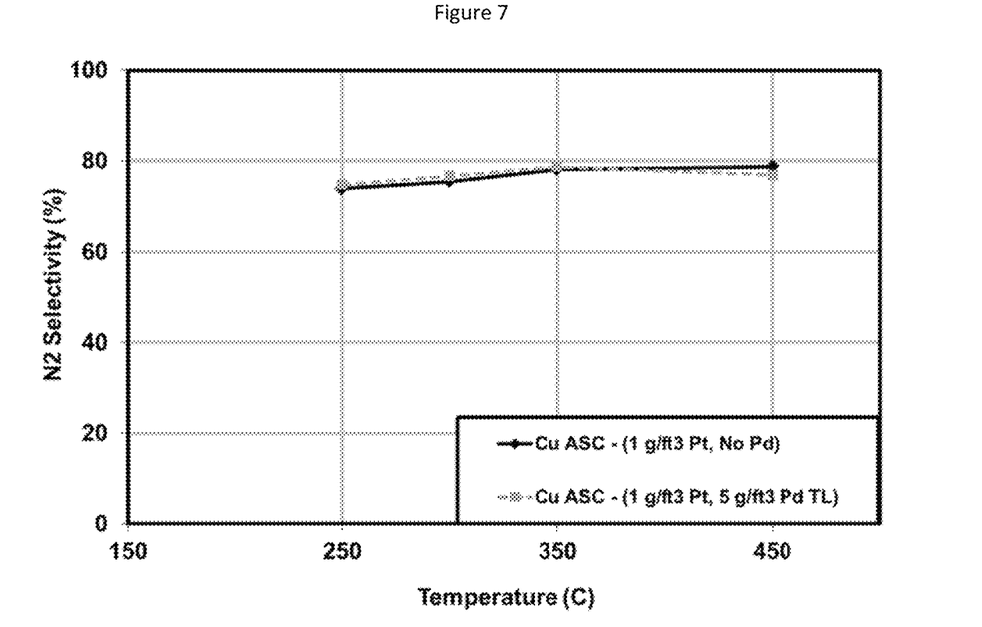
FIG. 7 is a graph depicting comparative $N_2$ selectivity for an embodiment of the invention.
Figure 8:
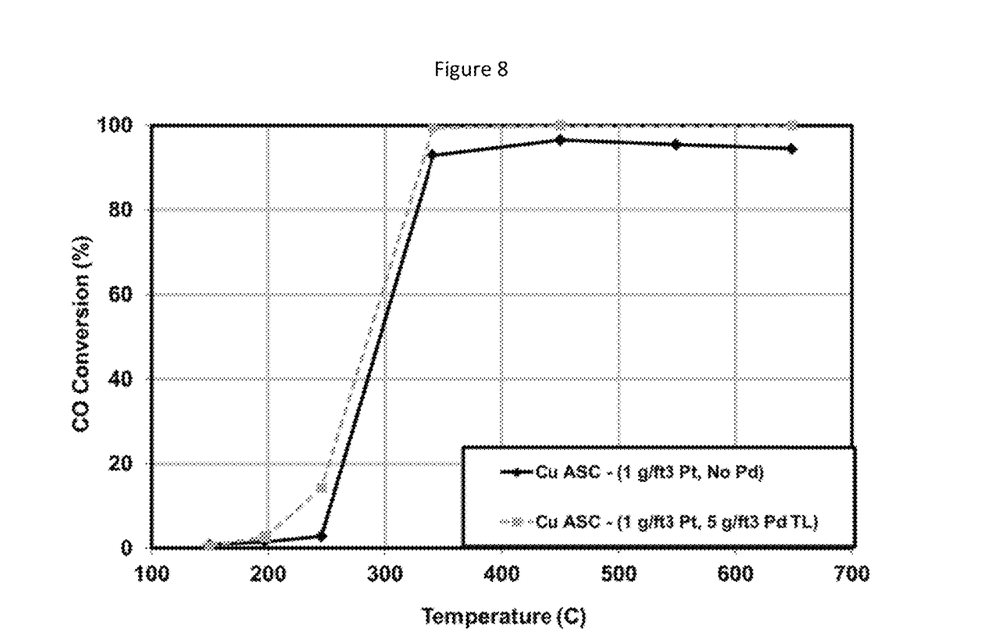
FIG. 8 is a graph depicting comparative CO conversion for an embodiment of the invention.

A catalyst sample having a top layer containing a mixture of a Cu/SAPO-34 SCR catalyst and a Pd oxidation catalyst and a bottom layer containing Pt AMOX catalyst was evaluated for $N_2$ selectivity for $NH_3$ conversion over a wide range of temperatures and also for CO conversion. These results were compared to a similar catalyst, but without the Pd oxidation catalyst in the top layer. The catalyst having Pd in the top layer shows significantly better CO conversion performance compared to the catalyst without Pd in the top layer. (FIG. 8) Surprisingly, the catalyst prepared with and without the Pd top layer show very similar performance in terms of $N_2$ selectively for $NH_3$ conversion. (FIG. 7)

What is claimed is:

1. A catalyst article for treating exhaust gas comprising a substrate having a first catalyst layer disposed on and/or within the substrate and a second catalyst layer coated over the first catalyst layer; wherein
   the first catalyst layer comprises a first oxidation catalyst, wherein the first oxidation catalyst comprises a supported noble metal, and
   the second catalyst layer contains a mixture of (i) a second oxidation catalyst consisting of supported palladium and (ii) a catalyst for selectively reducing $NO_x$ and/or storing $NH_3$, wherein the catalyst for selectively reducing $NO_x$ and/or storing $NH_3$ is a Fe and/or Cu loaded zeolite; and
   wherein the first and second oxidation catalysts are different formulations.

2. The catalyst article of claim 1, wherein the second catalyst layer is essentially free of Ag, Au, Pt, Rh, Ru, Ir, and Os.

3. The catalyst article of claim 1, wherein the first oxidation catalyst is Pt supported on metal oxide particles or a mixture of Pt and Pd supported on metal oxide particles.

4. The catalyst of claim 1, wherein the substrate is a flow-through honeycomb having a wall porosity of about 50-65%.

5. The catalyst article of claim 4, wherein a majority of the first catalyst layer is disposed within the substrate walls and a majority of the second catalyst layer is disposed on the surface of the substrate walls.

6. A catalyst article for treating an exhaust gas comprising:
   a. a substrate;
   b. a first catalyst layer disposed on and/or within the substrate, wherein the first catalyst layer comprises a first oxidation catalyst, and wherein the first oxidation catalyst comprises a supported noble metal;
   c. a second catalyst layer disposed over the first catalyst layer, wherein the second catalyst layer contains a catalyst for selectively reducing $NO_x$ and/or storing $NH_3$, wherein the catalyst for selectively reducing $NO_x$ and/or storing $NH_3$ is a Fe and/or Cu loaded zeolite; and
   d. a third catalyst layer disposed over the second catalyst layer, wherein the third catalyst layer comprises a second oxidation catalyst consisting of supported Pd;
   wherein the first and second oxidation catalysts are different formulations.

7. The catalyst article of claim 6, wherein the third catalyst layer is essentially free of ruthenium, rhenium, rhodium, silver, osmium, iridium, platinum, gold, alkali and alkaline earth metals, and transition metals, except transition metals in the form of a metal oxide particle support for the palladium.

8. A catalyst article for treating an exhaust gas comprising:
   a. a substrate;
   b. a first catalyst layer disposed on and/or within the substrate, wherein the first catalyst layer comprises a first oxidation catalyst, and wherein the first oxidation catalyst comprises a supported noble metal;
   c. a second catalyst layer disposed over the first catalyst layer, wherein the second catalyst layer contains a catalyst for selectively reducing $NO_x$ and/or storing $NH_3$, wherein the catalyst for selectively reducing $NO_x$ and/or storing $NH_3$ is a Fe and/or Cu loaded zeolite; and
   d. a third catalyst layer disposed upstream of the first and second catalyst layers, wherein the third catalyst layer comprises a second oxidation catalyst consisting of supported Pd;
   wherein the first and second oxidation catalysts are different formulations.

* * * * *